United States Patent
Arakawa et al.

(10) Patent No.: US 10,895,470 B2
(45) Date of Patent: Jan. 19, 2021

(54) TRAVEL CONTROL APPARATUS, TRAVEL CONTROL SYSTEM, AND TRAVEL CONTROL METHOD

(71) Applicant: TOYOTA JIDOSHA KABUSHIKI KAISHA, Toyota (JP)

(72) Inventors: Seiji Arakawa, Sunto-gun (JP); Naotoshi Kadotani, Sunto-gun (JP); Junya Watanabe, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 16/108,427

(22) Filed: Aug. 22, 2018

(65) Prior Publication Data
US 2019/0086231 A1 Mar. 21, 2019

(30) Foreign Application Priority Data
Sep. 15, 2017 (JP) .................. 2017-177454

(51) Int. Cl.
*G01C 21/36* (2006.01)
*B60W 50/08* (2020.01)
(Continued)

(52) U.S. Cl.
CPC ....... *G01C 21/3697* (2013.01); *B60W 30/182* (2013.01); *B60W 50/082* (2013.01);
(Continued)

(58) Field of Classification Search
CPC ............ G01C 21/3697; G01C 21/32; G01C 21/3407; G06F 16/29; B60W 30/182; B60W 50/082; G05D 1/0088
See application file for complete search history.

(56) References Cited

U.S. PATENT DOCUMENTS

2005/0071077 A1 3/2005 Kadono et al.
2009/0187336 A1* 7/2009 Kawamata ............. G01C 21/32
                                                                    701/532
(Continued)

FOREIGN PATENT DOCUMENTS

JP          05-199167 A      8/1993
JP          2001-147120 A    5/2001
(Continued)

OTHER PUBLICATIONS

Machine Translation of JP2003233897A (Year: 2002).*

*Primary Examiner* — Anne Marie Antonucci
*Assistant Examiner* — Andrew J Cromer
(74) *Attorney, Agent, or Firm* — Sughrue Mion, PLLC

(57) ABSTRACT

A travel control apparatus includes a travel control unit, an information addition unit configured to add the acquired additional information to map information, a required capacity acquisition unit configured to acquire a required capacity, and a remaining capacity acquisition unit configured to acquire a remaining capacity of the communication capacity. The travel control unit is configured to be able to perform the travel control in a plurality of modes including at least a first mode and a second mode and is configured to perform the travel control in any one of the modes based on the required capacity and the remaining capacity. The first mode is a mode of travel control performed based on the map information and is a mode of travel control of the vehicle in which the required capacity of the additional information is larger than that in the second mode.

6 Claims, 8 Drawing Sheets

(51) Int. Cl.
- *B60W 30/182* (2020.01)
- *G05D 1/00* (2006.01)
- *G06F 16/29* (2019.01)
- *G01C 21/32* (2006.01)
- *G01C 21/34* (2006.01)

(52) U.S. Cl.
CPC ......... *G01C 21/32* (2013.01); *G01C 21/3407* (2013.01); *G05D 1/0088* (2013.01); *G06F 16/29* (2019.01); *B60W 2556/50* (2020.02); *G05D 2201/0213* (2013.01)

(56) References Cited

U.S. PATENT DOCUMENTS

| | | | |
|---|---|---|---|
| 2013/0030688 A1* | 1/2013 | Shimizu | G08G 1/161 701/301 |
| 2017/0227971 A1 | 8/2017 | Shimotani et al. | |
| 2018/0038701 A1 | 2/2018 | Iwai et al. | |

FOREIGN PATENT DOCUMENTS

| | | | |
|---|---|---|---|
| JP | 2003-233897 A | | 8/2003 |
| JP | 2003233897 A | * | 8/2003 |
| JP | 2019-53394 A | | 4/2019 |
| WO | 2016/035199 A1 | | 3/2016 |
| WO | 2016/139748 A1 | | 9/2016 |
| WO | 2017/051478 A1 | | 3/2017 |

\* cited by examiner

TRAVEL CONTROL APPARATUS, TRAVEL CONTROL SYSTEM, AND TRAVEL CONTROL METHOD

CROSS-REFERENCE TO RELATED APPLICATION

This application claims the benefit of priority from Japanese Patent Application No. 2017-177454, filed Sep. 15, 2017, the entire contents of which are incorporated herein by reference.

TECHNICAL FIELD

The present disclosure relates to a travel control apparatus, a travel control system, and a travel control method.

BACKGROUND

An apparatus is known, which has a function of acquiring additional information to be added to map information via communication with surroundings and adding the acquired additional information to the map information. For example, a navigation apparatus having such a function is disclosed in Japanese Unexamined Patent Publication No. 2003-233897.

SUMMARY

Incidentally, when a travel control is performed on a vehicle in a mode of high driving assistance level, detailed and new map information is required. Therefore, the additional information may be acquired via the communication with surroundings during the performance of the travel control. Here, generally, when the communication with surroundings is performed, a limit value of the communication capacity is set in advance according to the communication cost prepaid by a user. Therefore, if the travel control is continued in the mode of high driving assistance level regardless of the communication capacity, when the communication capacity reaches the limit value, the user may have to purchase additional communication capacity.

Therefore, in the present technical field, it is desirable to provide a travel control apparatus, a travel control system, and a travel control method that can change the mode of travel control according to the communication capacity.

A travel control apparatus according to an aspect of the present disclosure is a travel control apparatus that is configured to perform a travel control of a vehicle. The travel control apparatus includes an ECU. The ECU is configured to perform the travel control of the vehicle, acquire additional information to be added to map information via communication with surroundings, and to add the acquired additional information to the map information, acquire a required capacity that is a communication capacity necessary for acquiring the additional information, acquire a remaining capacity of the communication capacity calculated based on a limit value of the communication capacity set in advance, and perform the travel control of the vehicle in a plurality of modes including at least a first mode and a second mode, and to perform the travel control of the vehicle in any one of the modes based on the acquired required capacity and the acquired remaining capacity. The first mode is a mode of travel control of the vehicle performed based on the map information and is a mode of travel control of the vehicle in which the required capacity of the acquired additional information is larger than that in the second mode.

According to various aspects of the present disclosure, it is possible to change the mode of travel control according to the communication capacity.

DETAILED DESCRIPTION

Figure 1:
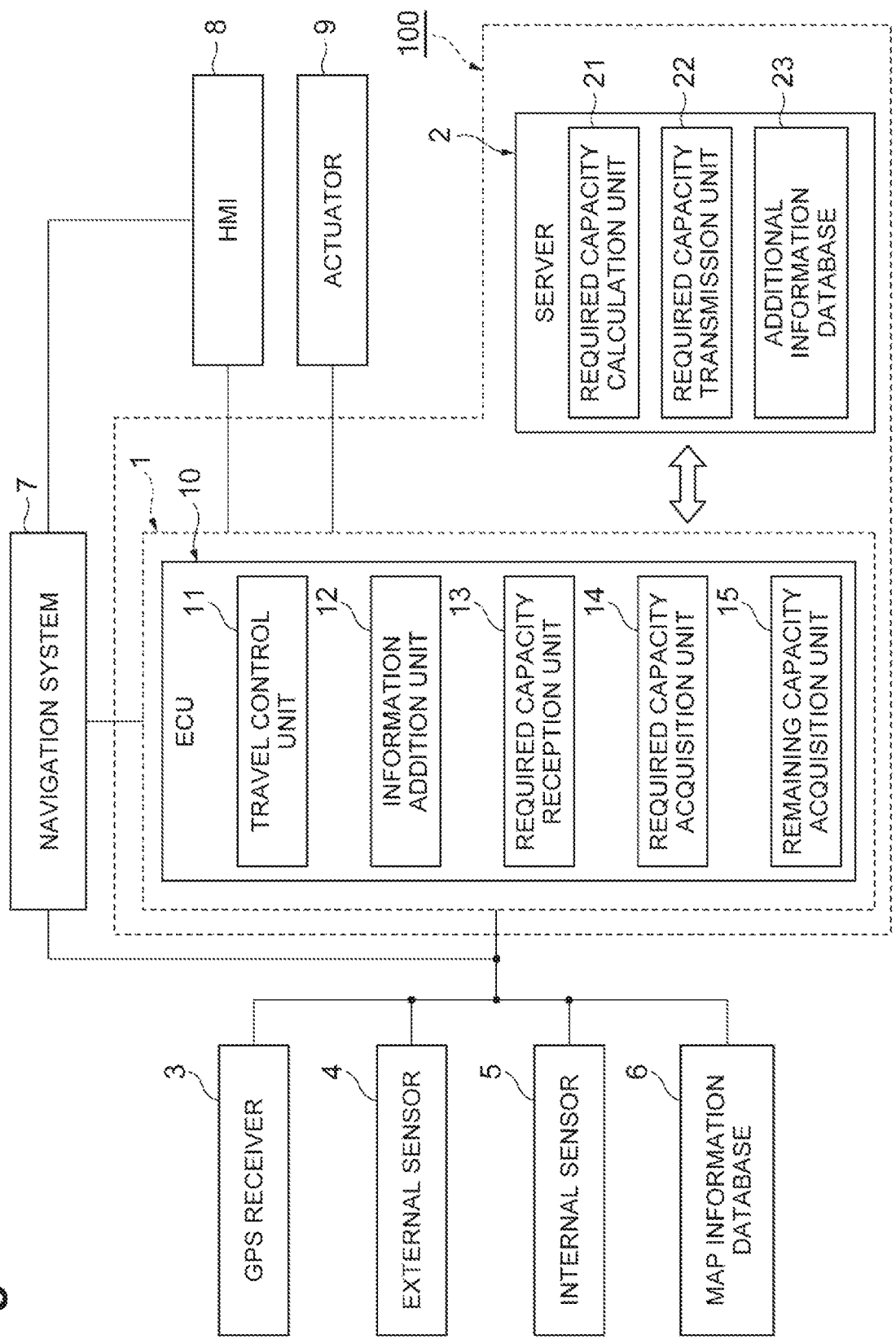
FIG. 1 is a block diagram illustrating a travel control system in a first embodiment.

Hereinafter, exemplary embodiments of the present disclosure will be described. In the drawings, the same reference numerals will be given to the same or equivalent elements, and the description thereof will not be repeated.

First Embodiment

FIG. 1 is a block diagram illustrating a travel control system 100 in a first embodiment. As illustrated in FIG. 1, the travel control system 100 includes a travel control apparatus 1 and a server 2. The travel control apparatus 1 is an apparatus that is mounted on a vehicle such as a passenger car, and can perform travel control of the vehicle. The server 2 is a device capable of communicating with the travel control apparatus 1 and transmitting and receiving information to and from the travel control apparatus 1.

The travel control apparatus 1 can perform the travel control of the vehicle in at least one of a first mode and a second mode. The travel control in the first mode is a travel control with a higher driving assistance level compared to the travel control in the second mode. The travel control in the first mode is the travel control performed based on map information and is based on detailed and new map information compared to the travel control in the second mode. The travel control in the second mode may not be necessarily performed based on the map information. As an example, in the present embodiment, the travel control in the first mode is an autonomous driving control, and the travel control in the second mode is a lane tracing assist (LTA).

The autonomous driving control is a travel control that causes the vehicle to autonomously travel toward a destination set in advance. The destination may be set by a user such as a driver, or may be set autonomously by the travel control apparatus 1. In the autonomous driving control, the user does not need to perform a driving operation and the vehicle travels autonomously. The LTA is a control that autonomously performs steering of the vehicle so as not to deviate from the traveling lane based on a result of recognition of lane boundary lines and a travel trajectory of a preceding vehicle.

The travel control apparatus 1 includes an electronic control unit (ECU) 10 that performs overall management of the apparatus. The ECU 10 is connected to a global positioning system (GPS) receiver 3, an external sensor 4, an internal sensor 5, a map information database 6, a navigation system 7, a human machine interface (HMI) 8 and an actuator 9. The ECU 10 is an electronic control unit including a central processing unit (CPU), read only memory (ROM), random access memory (RAM), a controller area network (CAN) including a communication circuit, and the like.

The ECU 10 is connected to a network for communication using, for example, a CAN communication circuit, and is communicably connected to each component of the vehicle. That is, the ECU 10 can refer to a result of measurement performed by the GPS receiver 3, results of measurement performed by the external sensor 4 and the internal sensor 5, the map information stored in the map information database 6, and information input to the HMI 8. In addition, the ECU 10 can add new information to the map information database 6 and output signals to the HMI 8 and actuator 9.

The ECU 10 can, for realize various functions of travel control described later, by, for example, loading a program stored in the ROM into the RAM and executing the program loaded in the RAM by the CPU. The ECU 10 may be configured with a plurality of ECUs.

The GPS receiver 3 receives signals from equal to or more than three GPS satellites and acquires position information indicating a position of the vehicle. The position information includes, for example, latitude and longitude. The GPS receiver 3 transmits the measured position information on the vehicle to the ECU 10. Instead of the GPS receiver 3, other means by which the latitude and longitude of the position of the vehicle can be identified may be used.

The external sensor 4 is a vehicle-mounted detection device that detects a surrounding environment of the vehicle. The external sensor 4 includes at least one of a camera and a radar sensor. The camera is an imaging device that images the external situation of the vehicle. The camera is provided on the inside of a windshield of the vehicle. The camera may be a monocular camera or may be a stereo camera. The stereo camera has two imaging units that are arranged so as to reproduce a binocular parallax. The image information of the stereo camera also includes information (distance information) on the depth direction of the imaged image. The camera transmits the image information relating to the external situation of the vehicle to the ECU 10.

The radar sensor is a detection device that detects obstacles around the vehicle using radio waves (for example, millimeter waves) or light. The radar sensor includes, for example, at least one of the millimeter wave radar or a light detection and ranging (LIDAR). The radar sensor transmits the radio wave or light to the surroundings of the vehicle and detects the obstacles by receiving radio waves or light reflected from obstacles. The radar sensor transmits the detected obstacle information to the ECU 10.

The internal sensor 5 is a detection device that detects a travel state of the vehicle. The internal sensor 5 includes a vehicle speed sensor, an accelerator sensor, and a yaw rate sensor. The vehicle speed sensor is a measuring device that measures a speed of the vehicle. As the vehicle speed sensor, for example, a vehicle wheel speed sensor is used, which is provided on vehicle wheels of the host vehicle or on a drive shaft rotating integrally with vehicle wheels, and measures a rotational speed of the vehicle wheels.

The accelerator sensor is a measuring device that measures an acceleration of the vehicle. The accelerator sensor may include, for example, a longitudinal accelerator sensor that measures acceleration in the longitudinal direction of the vehicle and a lateral accelerator sensor that measures a lateral acceleration of the vehicle. The yaw rate sensor is a measuring device that measures a yaw rate (rotation angular velocity) around the vertical axis at the center of gravity of the vehicle. As the yaw rate sensor, for example, a Gyro sensor can be used.

The map information database 6 is a database that stores map information. The map information database 6 is formed, for example, in a hard disk drive (HDD) mounted on the vehicle. The map information is information stored in advance in the map information database 6 of the vehicle among the information items relating to the map. The map information includes position information on the road, information on the shape of the road (for example, a curve, types of straight lines, a curvature of the curve or the like), position information on the intersection, information on position of the merging point and the branch, and information on the position of buildings. The map information may also include position information on the structure on the road such as a guide plate and a road sign. The map information database 6 may be formed in a computer of a facility such as a management center capable of communicating with the vehicle.

The navigation system 7 is mounted on the vehicle and sets a target route on which the vehicle travels by the autonomous driving control. The navigation system 7 calculates the target route to reach the destination from a current position of the vehicle based on the destination set in advance, the position information on the vehicle measured by the GPS receiver 3, and the map information in the map information database 6. The destination in the autonomous driving control may be set by the user of vehicle operating the input button (or touch panel) of the navigation system 7 or may be automatically set by the travel control apparatus 1. The navigation system 7 can set the target route by a well-known method. The navigation system 7 may have a function of performing a guidance along the target route during the manual driving of the vehicle by the driver. The navigation system 7 outputs the information on the target route of the vehicle to the ECU 10. A part of the functions of the navigation system 7 may be performed by a server of a facility such as a management center capable of communicating with the vehicle. The function of the navigation system 7 may be performed in the ECU 10.

The HMI 8 is an interface that performs inputting and outputting of the information between the travel control apparatus 1 and the user. The HMI 8 includes, for example, a display, a speaker, and the like. The HMI 8 outputs an image on the display and outputs a voice from the speaker according to a control signal from the ECU 10. The display may be a head-up display. For example, the HMI 8 includes input devices (buttons, a touch panel, a voice input device, or the like) for accepting input from the user.

The actuator 9 is a device used for controlling the vehicle. The actuator 9 includes at least a throttle actuator, a brake actuator, and a steering actuator.

The throttle actuator controls a driving force of the vehicle by controlling an amount of air (throttle opening degree) supplied to the engine according to the control signal from the ECU 10. If the vehicle is a hybrid vehicle, in addition to the amount of air supplied to the engine, the control signal from the ECU 10 is input to a motor as a power source, and the driving force of the vehicle is controlled. If the vehicle is an electric vehicle, the control signal from the ECU 10 is input to a motor (a motor that functions as an engine) as a power source, and the driving force of the vehicle is controlled. The motor as the power source in these cases configures the actuator 9.

The brake actuator controls the brake system according to the control signal from the ECU 10 and controls a braking force applied to the wheels of the vehicle. For example, a hydraulic brake system can be used as the brake system. The steering actuator controls the driving of an assist motor controlling a steering torque of an electric power steering system according to the control signal from the ECU 10. In this way, the steering actuator controls the steering torque of the vehicle.

Next, a functional configuration of the ECU 10 will be described. The ECU 10 includes a travel control unit 11, an information addition unit 12, a required capacity reception unit 13, a required capacity acquisition unit 14, and a remaining capacity acquisition unit 15. A part of the functions of the ECU 10 may be performed by a computer of a facility such as a management center capable of communicating with the vehicle, or may be performed by a mobile information terminal capable of communicating with the vehicle.

The travel control unit 11 executes travel control of the vehicle. The travel control unit 11 can perform the travel control of the vehicle in at least one of the first mode and the second mode. The first mode is a mode of travel control of the vehicle performed based on the map information, and is the mode of travel control of the vehicle in which a required capacity of additional information acquired by the information addition unit 12 is larger than that in the second mode, as described later. The second mode may be a mode of travel control of the vehicle that performed based on the map information, or may be a mode of travel control of the vehicle performed not based on the map information. The required capacity is a communication capacity required for acquiring the additional information. The required capacity increases as the amount of the additional information increases. As described above, in the present embodiment, the travel control in the first mode is an autonomous driving control, and the travel control in the second mode is the LTA. The travel control unit 11 performs the travel control of the vehicle in any one of the modes based on the required capacity and a remaining capacity described below.

The travel control unit 11 generates a travel plan that causes the vehicle to travel along the target route set by the navigation system 7 when the autonomous driving control to reach the destination is performed set in advance. The travel plan includes, for example, movement paths and movement speeds. The travel control unit 11 generates the travel plan for the vehicle using a known method. The travel control unit 11 performs the autonomous driving control of the vehicle along the travel plan based on the position information on the vehicle measured by the GPS receiver 3, the various information items acquired by the external sensor 4 and the internal sensor 5 (the surrounding environment of the vehicle and the travel state of the vehicle), and the map information in the map information database 6. The map information includes the map information stored in advance in the map information database 6 and the additional information added to the map information. The travel control unit 11 can perform the autonomous driving control with the higher driving assistance levels as the amount of additional information increases. The travel control unit 11 performs the autonomous driving control by controlling the vehicle by transmitting the control signal to the actuator 9.

When the LTA is performed, the travel control unit 11 performs the travel control based on various information items acquired by the external sensor 4 and the internal sensor 5 (the surrounding environment of the vehicle and the travel state of the vehicle). The travel control unit 11 controls the vehicle by transmitting a control signal to the actuator 9 to perform the LTA.

The information addition unit 12 acquires the additional information to be added to the map information through communication with surroundings, and adds the acquired additional information to the map information. The information addition unit 12 acquires the additional information stored in an additional information database 23 of the server 2 through communication with the server 2, and stores the acquired additional information in the map information database 6 as described later. In this way, the information addition unit 12 adds the additional information to the map information stored in the map information database 6.

The additional information is information relating to the map that is not stored in advance in the map information database 6 of the vehicle, but is acquired when the travel control is performed. The additional information may include more detailed and newer map information than the map information stored in the map information database 6 in advance. Specifically, the additional information includes the position information of the road, information of the road shape (for example, types of curves and straight lines, curvature of curves, and the like), road width information, road height information, position information on the intersection, merging point, and branch point, and position information on the building. The map information may include position information related to the structure on the road such as the guide plate, the road sign, and may include temporary information such as construction information and congestion information.

The information addition unit 12 acquires the additional information on each predetermined area, for example, with the current position of the vehicle as a reference. The predetermined area may be, for example, 200 m ahead of the vehicle, 100 m in each of the left and right sides and the rear side. The information addition unit 12 acquires the additional information on the next predetermined area while the vehicle is traveling within the predetermined area for which the additional information is acquired. The information addition unit 12 determines a predetermined area to acquire the additional information next based on the target route in the travel plan. The information addition unit 12 may not acquire the additional information for a range that overlaps with the range in which the latest additional information is already acquired among the predetermined areas to acquire the additional information next.

The required capacity reception unit 13 receives the required capacity calculated by the required capacity calculation unit 21 of the server 2 and transmitted by the required capacity transmission unit 22 server 2, as described below. The required capacity acquisition unit 14 acquires the required capacity received by the required capacity reception unit 13 from the required capacity transmission unit 22 of server 2.

The remaining capacity acquisition unit 15 acquires the remaining capacity of the communication capacity calculated with the limit value of the communication capacity set in advance as the reference. The remaining capacity acquisition unit 15 stores the limit value of the communication capacity set in advance and the communication capacity already used for the communication with surroundings, and acquires the remaining capacity of the communication capacity based on those limit value and the used capacity (for example, by subtracting the communication capacity already used from the limit value of the communication capacity). The remaining capacity acquisition unit 15 may acquire the remaining capacity calculated at the outside such as by the server 2 via the communication.

Next, the functional configuration of the server 2 will be described. The server 2 includes the required capacity calculation unit 21, the required capacity transmission unit 22, and the additional information database 23.

The required capacity calculation unit 21 calculates the required capacity of the additional information acquired by the information addition unit 12 from the additional information database 23. The required capacity calculation unit 21 calculates the required capacity of the additional information of the predetermined area to acquire the additional information next based on, for example, the target route to reach the destination in the travel plan.

The required capacity transmission unit 22 transmits the required capacity calculated by the required capacity calculation unit 21 to the required capacity reception unit 13 of the travel control apparatus 1. The required capacity transmission unit 22 transmits the required capacity of the additional information on the next predetermined area to the required capacity reception unit 13 while the vehicle is traveling within the predetermined area for which the information addition unit 12 has already added the additional information to the map information database 6.

The additional information database 23 is a database that stores the additional information to be added to map information. The information stored in the additional information database 23 is updated to the latest information, for example, on a regular basis or when the map is changed. The additional information database 23 is formed, for example, in the HDD in the server 2. The additional information database 23 may also be formed in a computer of a facility such as a management center capable of communicating with the vehicle.

Figure 2:
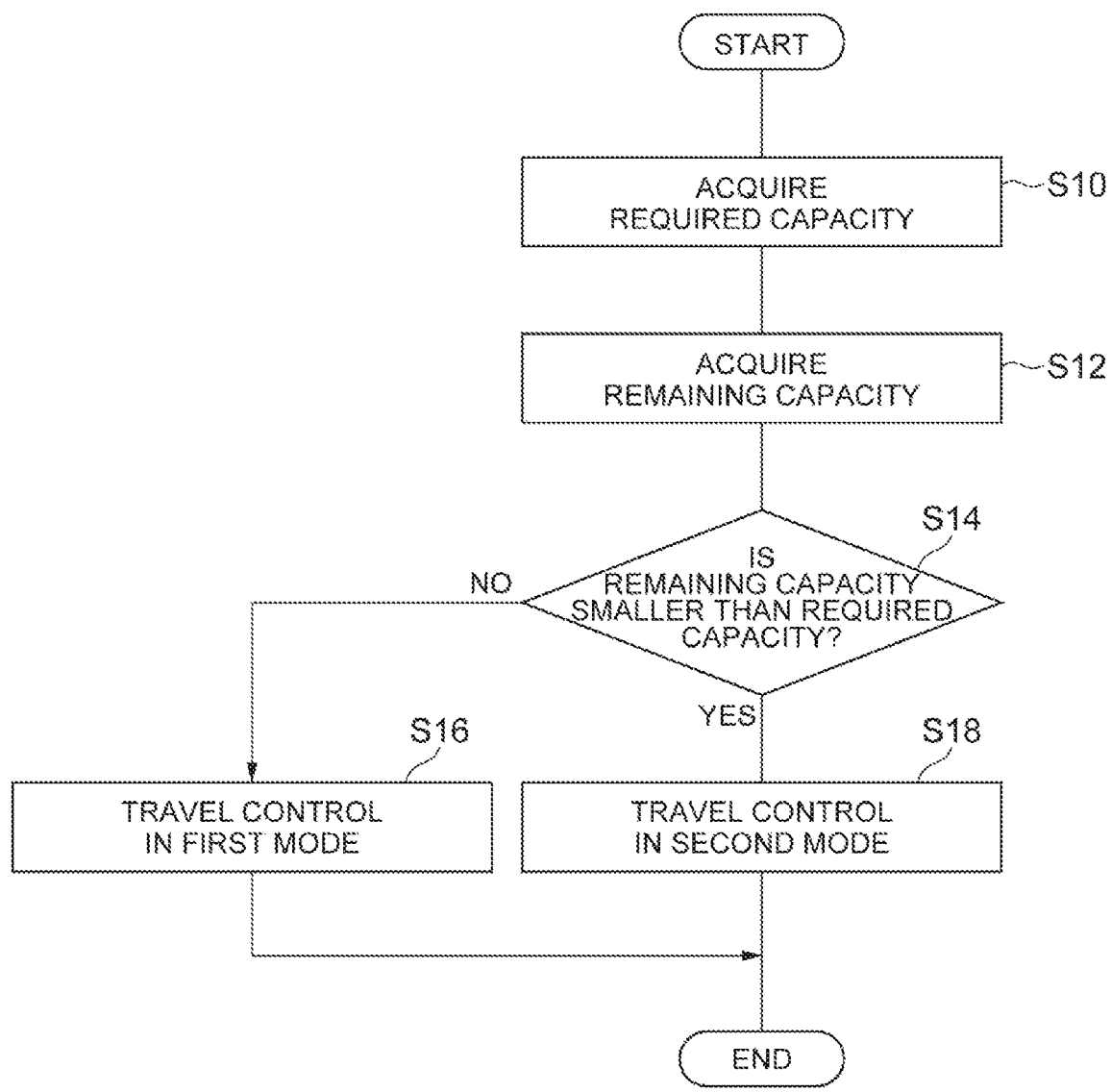
FIG. 2 is a flowchart illustrating a mode of travel control determination processing.

Hereinafter, determination processing by the travel control system 100 in the first embodiment for the travel control of the vehicle will be described. FIG. 2 is a flowchart illustrating the mode of travel control determination processing. The flowchart in FIG. 2 is executed at the time of starting and during performing of the autonomous driving control.

As illustrated in FIG. 2, in STEP S10, in the travel control unit 11 of the travel control apparatus 1, the destination in the autonomous driving control is set by the user or the travel control apparatus 1. The travel control unit 11 acquires the target route set by the navigation system 7 based on the set destination. In addition, the travel control apparatus 1 acquires the required capacity necessary for acquire the additional information to be added to the map information stored in the map information database 6 using the required capacity acquisition unit 14 by the communication with the server 2 based on the target route (required capacity acquisition step). Thereafter, the travel control apparatus 1 makes the process proceed to STEP S12.

In STEP S12, the travel control apparatus 1 acquires the remaining capacity of the communication capacity calculated with the limit value of the communication capacity set in advance as the reference using the remaining capacity acquisition unit 15 (remaining capacity acquisition step). Thereafter, the travel control apparatus 1 makes the process proceed to STEP S14.

In STEP S14, the travel control apparatus 1 determines whether or not the remaining capacity is smaller than the required capacity using the travel control unit 11 (a part of the travel step). If it is determined that the remaining capacity is not smaller than the required capacity (NO in STEP S14), the travel control apparatus 1 makes the process proceed to STEP S16. On the other hand, if it is determined that the remaining capacity is smaller than the required capacity (YES in STEP S14), the travel control apparatus 1 makes the process proceed to STEP S18.

In STEP S16, the travel control apparatus 1 performs travel control in the first mode using the travel control unit 11. In the present embodiment, the travel control apparatus 1 acquires the additional information from the additional information database 23 using the information addition unit 12, and performs the autonomous driving control using the travel control unit 11 while adding the additional information to the map information in the map information database 6 (a part of travel control step). The travel control apparatus 1 ends the current processing when the travel control unit 11 performs the travel control in the first mode. Thereafter, the travel control apparatus 1 repeats the process from STEP S10.

In STEP S18, the travel control apparatus 1 starts the travel control in the second mode using the travel control unit 11. In the present embodiment, the travel control apparatus 1 does not acquire the additional information from the additional information database 23 using the information addition unit 12, but performs the LTA using the travel control unit 11 (a part of travel control step). The travel control apparatus 1 ends the current processing when the travel control unit 11 performs the travel control in the second mode. Thereafter, the travel control apparatus 1 repeats the process from STEP S10 again.

Figure 3:
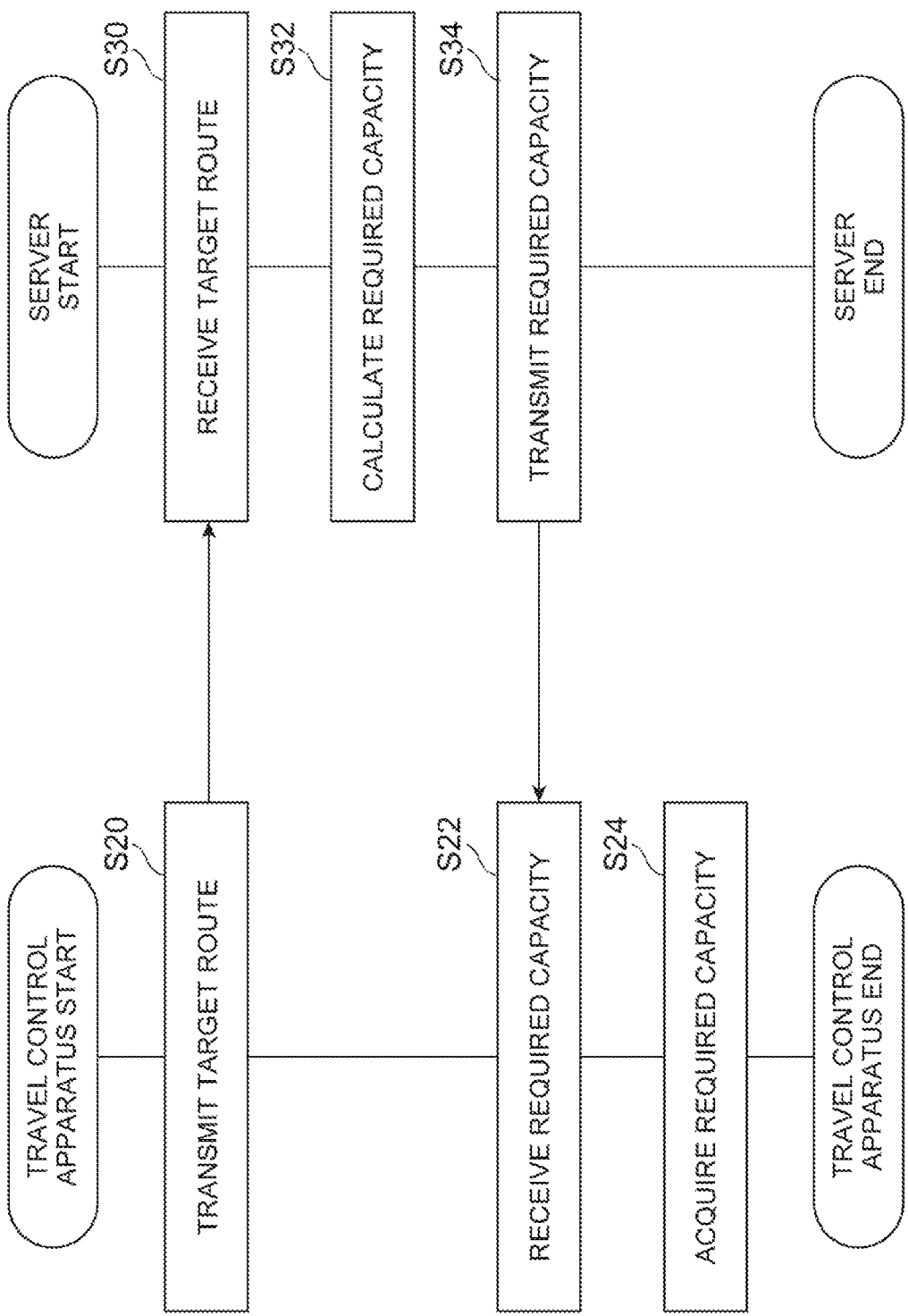
FIG. 3 is a flowchart illustrating required capacity acquisition processing.

Subsequently, required capacity acquisition processing by the travel control system 100 in the first embodiment will be described. FIG. 3 is a flowchart illustrating the required capacity acquisition processing. The required capacity acquisition processing corresponds to STEP S10 in FIG. 2.

As illustrated in FIG. 3, in STEP S20, the travel control system 100 transmits the target route to reach the destination set in advance to the server 2 using the travel control unit 11 of the travel control apparatus 1. Thereafter, the travel control system 100 makes the process proceed to STEP S30.

In STEP S30, the travel control system 100 receives the target route transmitted by the travel control unit 11 using the required capacity calculation unit 21 of the server 2. Thereafter, the travel control system 100 makes the process proceed to STEP S32.

In STEP S32, the travel control system 100 calculates the required capacity of the additional information on the predetermined area to be acquired from the additional information database 23 based on the received target route using the required capacity calculation unit 21 of the server 2. Thereafter, the travel control system 100 makes the process proceed to STEP S34.

In STEP S34, the travel control system 100 transmits the required capacity calculated by the required capacity calculation unit 21 to the required capacity reception unit 13 of the travel control apparatus 1 using the required capacity transmission unit 22 of the server 2. Thereafter, the travel control system 100 makes the process proceed to STEP S22.

In STEP S22, the travel control system 100 receives the required capacity transmitted from the required capacity transmission unit 22 using the required capacity reception unit 13 of the travel control apparatus 1. Thereafter, the travel control system 100 makes the process proceed to STEP S24.

In STEP S24, the travel control system 100 acquires the required capacity received by the required capacity reception unit 13 using the required capacity acquisition unit 14.

When the required capacity acquisition unit 14 acquires the required capacity, the travel control system 100 ends the current processing.

Operations and Effects of First Embodiment

According to the travel control apparatus 1, the travel control of the vehicle is performed in any one of the modes among a plurality of modes including at least the first mode and the second mode based on the required capacity and the remaining capacity. The travel control in the first mode is the autonomous driving control. The travel control in the second mode is the LTA. The autonomous driving control is the mode of travel control in which the required capacity for the additional information added to the map information in the map information database 6 is larger and the driving assistance level is higher than those in the LTA. If there is sufficient remaining capacity for the required capacity, the travel control apparatus 1 can perform the autonomous driving control. On the other hand, if there is no sufficient remaining capacity for the required capacity, the travel control apparatus 1 can perform the travel control by the LTA by reducing the amount of the additional information to be acquired or without acquiring the additional information. Accordingly, the travel control apparatus 1 can change the mode of travel control according to the communication capacity.

In addition, according to the travel control apparatus 1, detailed and new map information necessary for performing the travel control in the first mode is acquired for each predetermined area as the additional information. Therefore, it is not necessary to store entire of the map information items necessary for performing the travel control in the first mode, in the map information database 6 in advance. As a result, the travel control apparatus 1 can reduce the amount of map information to be stored in advance in the map information database 6.

According to the travel control system 100, since the server 2 calculates the required capacity, the travel control apparatus 1 does not need to calculate the required capacity. Accordingly, in the travel control system 100, it is possible to reduce the amount of calculation for the processing performed by the travel control apparatus 1.

According to a travel control method, the travel control of the vehicle is performed in any one of the modes among a plurality of modes including at least the first mode and the second mode based on the required capacity and the remaining capacity. The first mode is a mode of travel control in which the required capacity for the additional information added to the map information is larger and the driving assistance level is higher than those in the second mode. In the travel control method, if there is sufficient remaining capacity for the required capacity, the travel control can be performed in the first mode. On the other hand, in the travel control method, if there is no sufficient remaining capacity for the required capacity, the travel control can be performed in the second mode by reducing the amount of the additional information to be acquired or without acquiring the additional information. Accordingly, in the travel control method, the mode of travel control can be changed according to the communication capacity.

Second Embodiment

A configuration of a travel control system 100A in a second embodiment differs from that of the travel control system 100 in the first embodiment in points that the functions of a travel control unit 11A and a required capacity acquisition unit 14A are partially different respectively, and the travel control system 100A in the second embodiment includes an information providing unit 16A and a mode selection unit 17A. Other points are the same. Hereinafter, the description that overlaps with the first embodiment will not be repeated.

Figure 4:
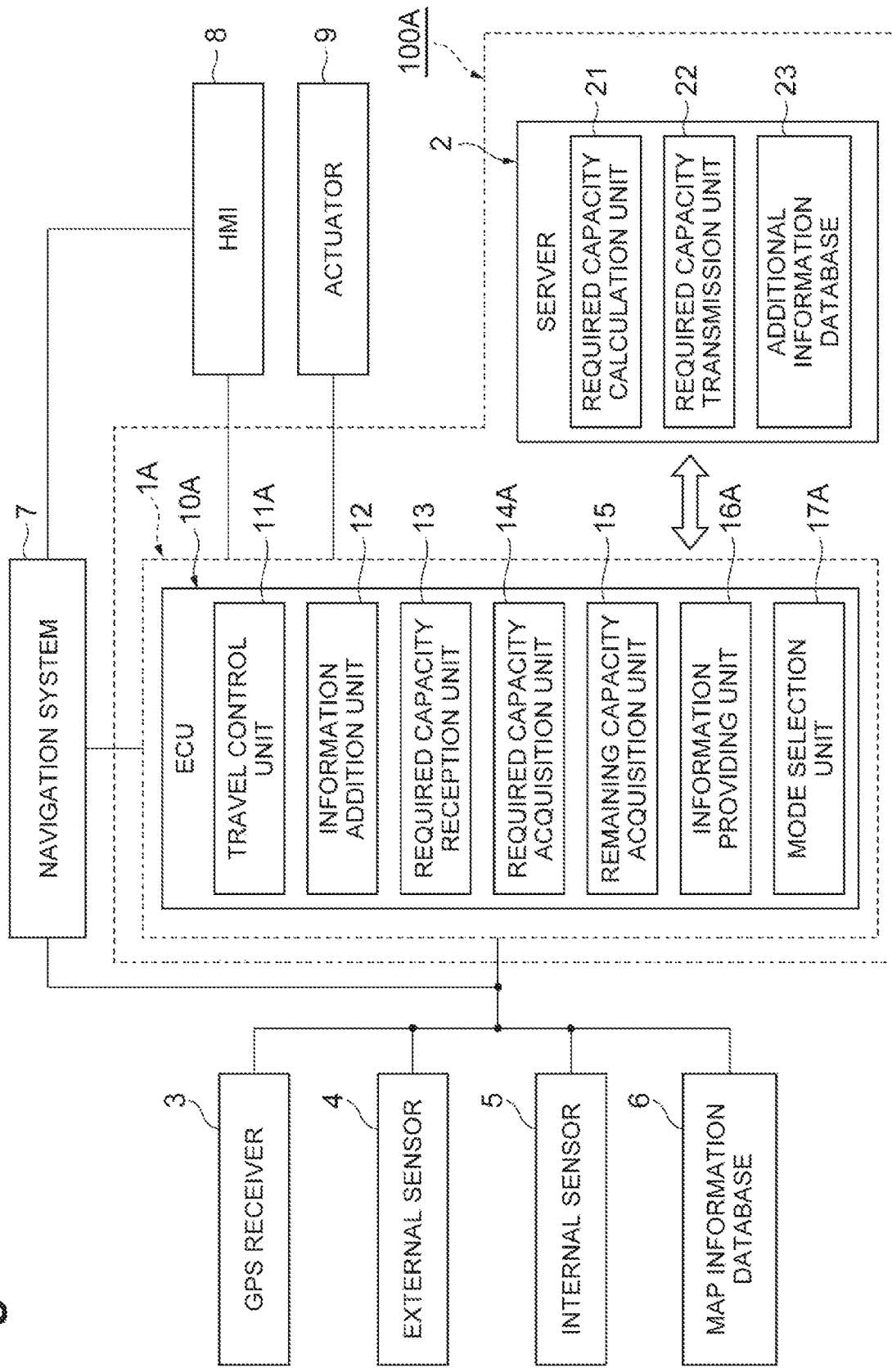
FIG. 4 is a block diagram illustrating a travel control system in a second embodiment.

FIG. 4 is a block diagram illustrating a travel control system 100A in the second embodiment. As illustrated in FIG. 4, the travel control system 100A includes the travel control apparatus 1A and the travel control apparatus 1A includes an ECU 10A. The ECU 10A includes the required capacity acquisition unit 14A, the information providing unit 16A, the mode selection unit 17A, and the travel control unit 11A.

If a destination is set for the travel control of the vehicle, the required capacity acquisition unit 14A acquires a total required capacity that is a total amount of required capacity necessary for performing the travel control of the vehicle to reach the destination in the first mode. The required capacity acquisition unit 14A acquires the required capacity for each predetermined area set along the target route to reach the destination that is received by the required capacity reception unit 13 from the required capacity transmission unit 22 of the server 2. The required capacity acquisition unit 14A sums each required capacity acquired, and acquires the total required capacity for reaching the destination. The total required capacity may be calculated in the server 2. That is, the required capacity calculation unit 21 of server 2 sums each required capacity to calculate the total required capacity, the required capacity transmission unit 22 of the server 2 transmits the total required capacity, the required capacity reception unit 13 of the travel control apparatus 1 receives the total required capacity, and then, the required capacity acquisition unit 14A of the travel control apparatus 1A may acquire the total required capacity.

The information providing unit 16A provides the user of the vehicle with information. If the travel control unit 11A determines that the remaining capacity is smaller than the total required capacity as described below, the information providing unit 16A provides the user with a plan to perform the travel control of the vehicle to reach the destination in the second mode. The information providing unit 16A may, for example, provide the user of the vehicle with the plan by causing the display of the HMI 8 to output an image, or may provide the user of the vehicle with the plan by output the voice from the speaker of the HMI 8.

The mode selection unit 17A causes the user to select the mode of travel control of the vehicle. The mode selection unit 17A causes the user who is provided with the plan to perform the travel control of the vehicle to reach the destination in the second mode by the information providing unit 16A, to select the mode of travel control of the vehicle to reach the destination to be performed by the travel control unit 11A. The mode selection unit 17A may, for example, cause the user to select the mode of travel control of the vehicle via the input device (touch panel, button, voice input device, or the like) of the HMI 8.

The travel control unit 11A determines whether or not the remaining capacity is smaller than the total required capacity acquired by the required capacity acquisition unit 14A. If it is determined that the remaining capacity is smaller than the total required capacity, the travel control unit 11A outputs the result of determination to the information providing unit 16A. In addition, if it is determined that the remaining capacity is smaller than the total required capacity, the travel control unit 11A generates a plan to perform the travel control of the vehicle to reach the destination in the second mode, and outputs the generated plan to the information providing unit 16A.

The travel control unit 11A performs the travel control of the vehicle in the mode selected by the user in response to the fact that the mode selection unit 17A causes the user to select the mode of travel control of the vehicle. For example, if the first mode is selected by the user as the mode of travel control of the vehicle, the travel control unit 11A performs the travel control of the vehicle in the first mode. In addition, if the second mode is selected by the user as the mode of travel control of the vehicle, the travel control unit 11A performs the travel control of the vehicle in the second mode.

If the first mode is selected by the user as the mode of travel control of the vehicle and the travel control of the vehicle is performed in the first mode, the travel control unit 11A performs the travel control of the vehicle to reach the destination in the first mode regardless of the remaining capacity at that time point. "That time point" refers to each of the continuous or intermittent time points during the traveling of the vehicle. That is, during performing of the travel control in the first mode selected by user, even if the remaining capacity becomes smaller than the required capacity of the additional information to be acquired next due to some reason before reaching the destination, the travel control unit 11A continues to perform the travel control in the first mode without changing the mode from travel control in in the first mode to travel control in the second mode. In this case, for example, the communication cost for the insufficient communication capacity may be temporarily borne by a person other than the user (for example, a service provider who transmits additional information, a communication carrier, or an automobile company).

Figure 5:
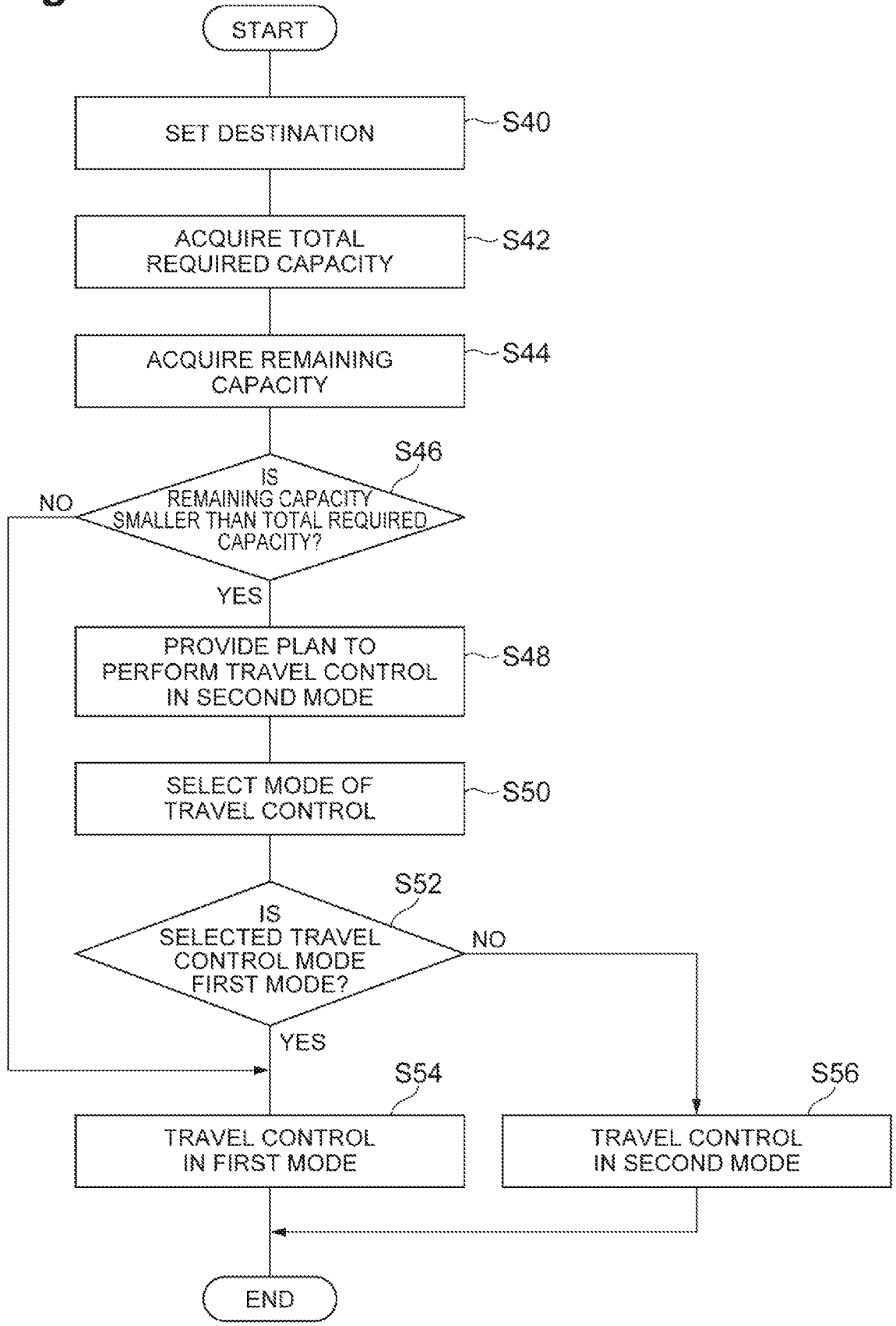
FIG. 5 is a flowchart illustrating a mode of travel control determination processing.

Hereinafter, determination processing for the travel control of the vehicle performed by the travel control system 100A in the second embodiment will be described. FIG. 5 is a flowchart illustrating the mode of travel control determination processing. The flowchart in FIG. 5 is executed when the intention to start the autonomous driving control of the vehicle is indicated by the user.

As illustrated in FIG. 5, in STEP S40, in the travel control unit 11A of the travel control apparatus 1A, a destination in the autonomous driving control is set by user or the travel control apparatus 1A. Thereafter, the travel control apparatus 1A makes the process proceed to STEP S42.

In STEP S42, the travel control apparatus 1A acquires a total required capacity that is a total amount of required capacity necessary for performing the travel control of the vehicle to reach the destination in the first mode using the required capacity acquisition unit 14A (required capacity acquisition step). Similarly to the travel control system 100 in the first embodiment, the required capacity acquisition unit 14A acquires the required capacity for each predetermined area set along the target route to reach the destination that is received by the required capacity reception unit 13 from the required capacity transmission unit 22 of the server 2 (refer to FIG. 3). The required capacity acquisition unit 14A sums each required capacity acquired, and acquires the total required capacity for reaching the destination. The total required capacity may be calculated in the server 2. As described above, the required capacity acquisition unit 14A acquires the required capacity (total required capacity) necessary for acquiring the additional information to be added to the map information stored in the map information database 6 through the communication with the server 2. Thereafter, the travel control apparatus 1A makes the process proceed to STEP S44.

In STEP S44, the travel control apparatus 1A acquires the remaining capacity of the communication capacity calculated with the limit value of the communication capacity set in advance as the reference using the remaining capacity acquisition unit 15 (remaining capacity acquisition step). Thereafter, the travel control apparatus 1A makes the process proceed to STEP S46.

In STEP S46, the travel control apparatus 1A determines whether or not the remaining capacity is smaller than the total required capacity using the travel control unit 11A (a part of the travel control step). If it is determined that the remaining capacity is not smaller than the total required capacity (NO in STEP S46), the travel control apparatus 1A makes the process proceed to STEP S54. On the other hand, if it is determined that the remaining capacity is smaller than the total required capacity (YES in STEP S46), the travel control apparatus 1A makes the process proceed to STEP S48.

In STEP S48, the travel control apparatus 1A provides the user with a plan to perform the travel control of the vehicle to reach the destination in the second mode using the information providing unit 16A. The information providing unit 16A may, for example, provide the user of the vehicle with the plan by causing the display of the HMI 8 to output an image, or may provide the user of the vehicle with the plan by outputting the sound from the speaker of the HMI 8. Thereafter, the travel control apparatus 1A makes the process proceed to STEP S50.

In STEP S50, the travel control apparatus 1A causes the user who is provided with the plan to perform the travel control of the vehicle to reach the destination in the second mode by the information providing unit 16A, to select the mode of travel control of the vehicle to be performed by the travel control unit 11A, using the mode selection unit 17A. The mode selection unit 17A may, for example, cause the user to select the mode of travel control of the vehicle via the input device (touch panel, button, voice input device, or the like) of the HMI 8. Thereafter, the travel control apparatus 1A makes the process proceed to STEP S52.

In STEP S52, the travel control apparatus 1A determines whether or not the mode of travel control selected by the user is the first mode using the travel control unit 11A. If it is determined that the mode of travel control selected by the user is the first mode (YES in STEP S52), the travel control apparatus 1A makes the process proceed to STEP S54. On the other hand, if it is determined that the mode of travel control selected by the user is not the first mode (that is, in the present embodiment, the mode of travel control selected by the user is the second mode) (NO in STEP S52), the travel control apparatus 1A makes the process proceed to STEP S56.

In STEP S54, the travel control apparatus 1A starts the travel control in the first mode using the travel control unit 11A. In the present embodiment, the travel control apparatus 1A performs the autonomous driving control using the travel control unit 11A while acquiring the additional information from the additional information database 23 by the information addition unit 12 and adding the additional information to the map information in the map information database 6 (a part of travel control step).

In STEP S54, if the first mode is selected by the user as the mode of travel control of the vehicle and the travel control of the vehicle is performed in the first mode (that is, if the process proceeds to STEP S54 after the determination of YES in STEP S52), the travel control unit 11A performs the travel control of the vehicle to reach the destination in the first mode regardless of the remaining capacity at that time point. That is, during performing of the travel control in the first mode selected by user, even if the remaining capacity becomes smaller than the required capacity of the additional information to be acquired next due to some reason, the travel control unit 11A continues to perform the travel control in the first mode without changing the mode from travel control in the first mode to travel control in the second mode. When the autonomous driving control is performed by the travel control unit 11A and the vehicle reaches the destination, the travel control apparatus 1A ends the current processing.

In STEP S56, the travel control apparatus 1A starts the travel control in the second mode using the travel control unit 11A. In the present embodiment, the travel control apparatus 1A performs the travel control in the second mode using the travel control unit 11A without acquiring the additional information from the additional information database 23 by the information addition unit 12 (a part of travel control step). When the travel control is performed in the second mode by the travel control unit 11A, the travel control apparatus 1A ends the current processing.

Operations and Effects of Second Embodiment

The travel control apparatus 1A includes the information providing unit 16A that provides the user with the information on the vehicle and a mode selection unit 17A that causes the user to select the mode of travel control of the vehicle. If the destination in the travel control of the vehicle is set, the required capacity acquisition unit 14A acquires the total required capacity that is the total amount of required capacity for performing the travel control of the vehicle to reach the destination in the first mode, the information providing unit 16A provides the user with a plan to perform the travel control of the vehicle to reach the destination in the second mode when the remaining capacity is smaller than the total required capacity, the mode selection unit 17A causes the user who was provided with the plan to select the mode of travel control of the vehicle to be performed by the travel control unit 11A, and the travel control unit 11A performs the travel control of the vehicle in the mode selected by the user. In this way, if the remaining capacity is not sufficient for the total required capacity for reaching the destination in the travel control, the travel control apparatus 1A causes the user to select before starting traveling of the of the vehicle whether to perform the travel control in the first mode by making the user bear the new communication cost or to perform the travel control in the second mode without making the user bear the new communication cost. Accordingly, since the user himself/herself selects whether or not to bear the new communication cost, the travel control apparatus 1A can suppress the occurrence of the communication cost not intended by the user.

In the travel control apparatus 1A, if the travel control in the first mode is selected by the user as the mode of travel control of the vehicle and the travel control of the vehicle is performed with the travel control in the first mode, the travel control unit 11A performs the travel control of the vehicle to reach the destination with the travel control in the first mode regardless of the remaining capacity at that time point. In this way, when the user selects the travel control in the first mode, even when the remaining capacity becomes insufficient for the required capacity, the travel control apparatus 1A does not lower the driving assistance level of the travel control during the traveling of the vehicle. Accordingly, since the mode of travel control selected by the user is not changed depending on the communication capacity, the travel control apparatus 1A can reduce the inconvenience the user feels.

Warning Control

In the first embodiment and in the second embodiment, the travel control apparatuses 1 and 1A may perform warning control during performing the travel control in the first mode. In this case, the ECUs 10, 10A of the travel control apparatuses 1 and 1A may respectively include a warning control unit for performing the warning control. The warning control is a control to give a warning to the user that the remaining capacity is decreasing when the remaining capacity becomes smaller than a predetermined value in advance before the remaining capacity becomes smaller than the required capacity, and to determine the mode of travel control thereafter. Hereafter, the warning control will be described below.

Figure 6:
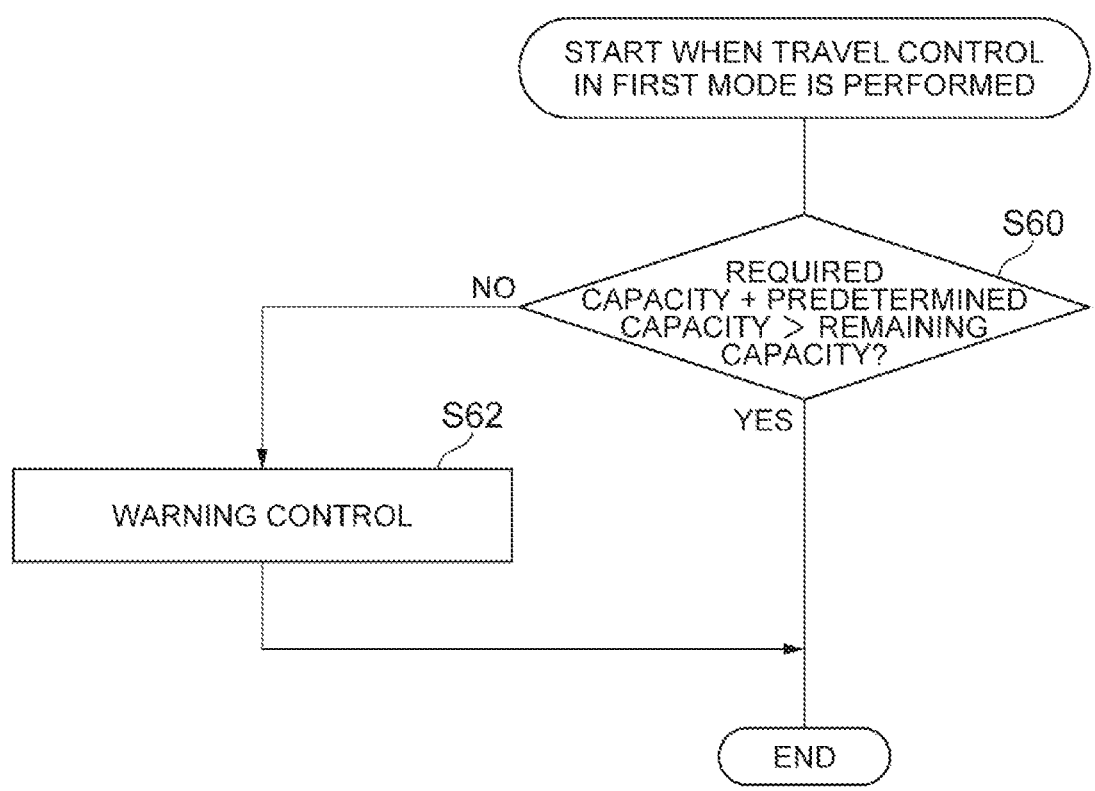
FIG. 6 is a flowchart illustrating warning control start processing.

FIG. 6 is a flowchart illustrating the warning control start processing. The flowchart of FIG. 6 is executed when the travel control in the first mode is performed on the vehicle.

As illustrated in FIG. 6, in STEP S60, the travel control apparatuses 1 and 1A determine whether or not the remaining capacity is smaller than a capacity obtained by adding the predetermined capacity set in advance to the required capacity using the travel control units 11 and 11A respectively. The predetermined capacity may be set by the user. If it is determined that the remaining capacity is not smaller than the capacity obtained by adding the predetermined capacity to the required capacity (NO in STEP S60), the travel control apparatuses 1 and 1A make the process proceed to STEP S62. On the other hand, if it is determined that the remaining capacity is smaller than the capacity obtained by adding the predetermined capacity to the required capacity (YES in STEP S60), the travel control apparatuses 1 and 1A end the current processing and make the process repeat from STEP S60 again.

In STEP S62, the travel control apparatuses 1 and 1A perform the warning control as described later. Thereafter, the travel control apparatuses 1 and 1A ends the current processing.

Figure 7:
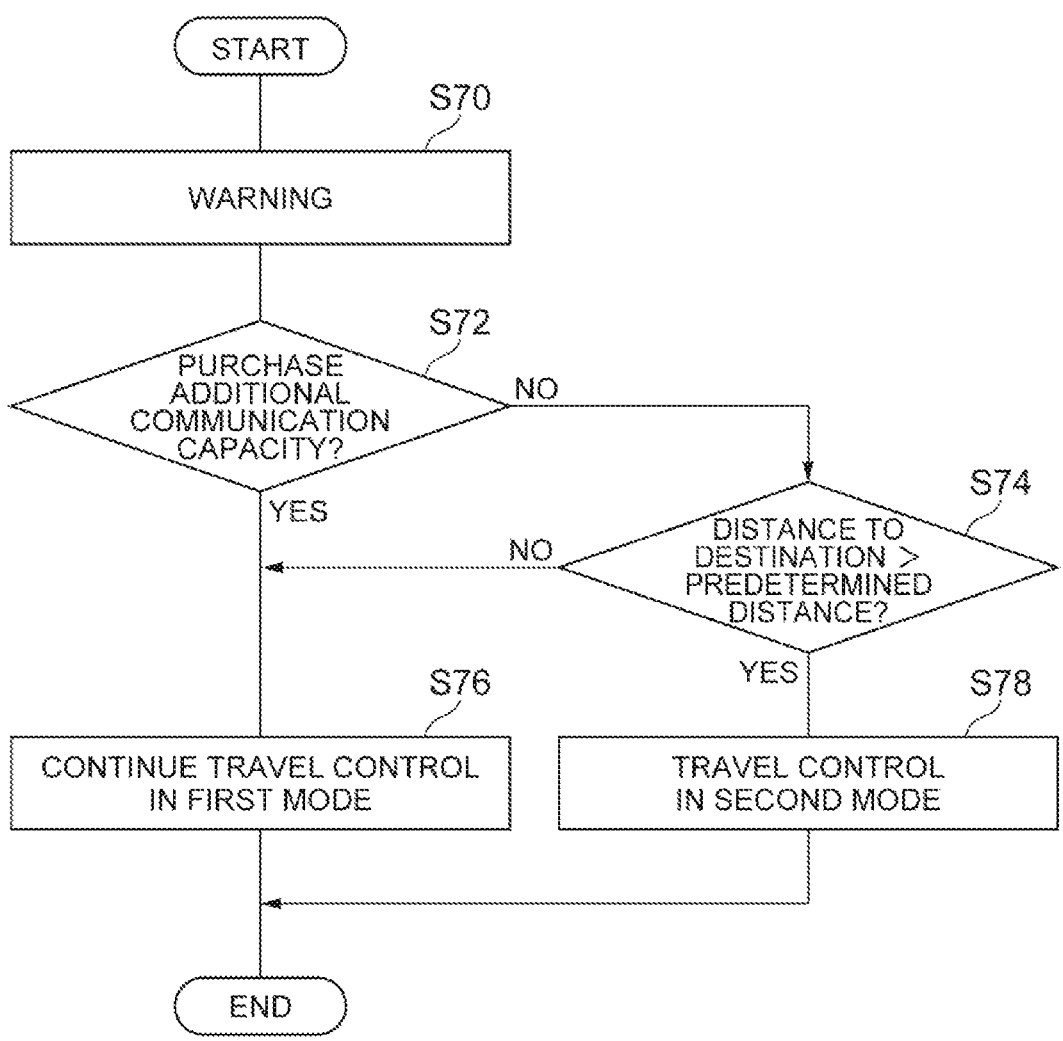
FIG. 7 is a flowchart illustrating a mode of travel control determination processing in the warning control.

Subsequently, the warning control will be described. FIG. 7 is a flowchart illustrating the mode of travel control determination processing in the warning control. The warning control corresponds to STEP S62 in FIG. 6.

As illustrated in FIG. 7, in STEP S70, the travel control apparatuses 1 and 1A give the warning to the user that the remaining capacity is decreasing via, for example, using a warning control unit via the HMI 8. For example, the warning control unit may give the warning to the user by outputting an image on the display of the HMI 8 or may give the warning to the user by outputting a sound from the speaker of the HMI 8. Thereafter, the travel control apparatuses 1 and 1A make the process to proceed to STEP S72.

IN STEP S72, the travel control apparatuses 1 and 1A cause the user of the vehicle to select whether or not to purchase additional communication capacity using the warning control unit. The warning control unit provides the user with, for example, options of purchasable communication capacity and the amount of money thereof. For example, the warning control unit may provide the user with the options by outputting an image on the display of the HMI 8, or may provide the user with the options by outputting the sound to the speaker of the HMI 8. Then, the warning control unit causes the user to select whether or not to purchase the additional communication capacity and, in a case of purchasing the additional purchase, to select the amount of communication capacity to purchase. The warning control unit may cause the user to select, for example, via the input device (touch panel, button, voice input device, or the like) of the HMI 8. If the user selects not to purchase the additional communication capacity (NO in STEP S72), the travel control apparatuses 1 and 1A make the process to proceed to STEP S74. On the other hand, if the user selects to purchase the additional communication capacity (YES in STEP S72), the travel control apparatuses 1 and 1A make the process to proceed to STEP S76.

In STEP S74, the travel control apparatuses 1 and 1A determine whether or not a distance to reach the destination is longer than a predetermined distance set in advance using the warning control unit. If it is determined that the distance to reach the destination is not longer than the predetermined distance set in advance (NO in STEP S74), the travel control apparatuses 1 and 1A make the process to proceed to STEP S76. On the other hand, if it is determined that the distance to reach the destination is longer than the predetermined distance set in advance (YES in STEP S74), the travel control apparatuses 1 and 1A make the process to proceed to STEP S78.

IN STEP S76, the travel control apparatuses 1 and 1A continue the travel control in the first mode using the travel control unit 11A. Thereafter, the travel control apparatuses 1 and 1A end the current processing.

In STEP S78, the travel control apparatuses 1 and 1A stops the travel control in the first mode and starts the travel control in the second mode using the travel control unit 11A. When the travel control in the first mode is started by the travel control unit 11A, the travel control apparatuses 1 and 1A end the current processing.

According to the warning control described above, if the remaining capacity becomes smaller than the predetermined value before the remaining capacity becomes smaller than the required capacity, and when the user wants to continue the travel control in the first mode, it is possible to determine to continue the travel control in the first mode before the remaining capacity actually becomes smaller than the required capacity. Accordingly, travel control apparatuses 1 and 1A can reduce the inconvenience the user feels.

STEP S74 described above may be omitted. That is, in STEP S72, if the user selects not to purchase the additional communication capacity (NO in STEP S72), the travel control apparatuses 1 and 1A may make the process proceed to STEP S78 without proceeding to STEP S74.

Modification Example of the First Embodiment and Second Embodiment

The above-described embodiments can be implemented in various forms in which various changes and improvements are made based on knowledge of those skilled in the art.

For example, in the first embodiment and in the second embodiment, the travel control in the first mode is not limited to the autonomous driving control as long as the travel control in the first mode is a mode of travel control performed based on the map information and if the required capacity of additional information acquired by the information addition unit 12 is larger than that in the second mode.

In addition, in the first embodiment and in the second embodiment, the travel control in the second mode is not limited to the LTA, and for example, may be the autonomous driving control performed by reducing the amount of acquired additional information than that of the autonomous driving control in the first mode (for example, the autonomous driving control that can be performed only in a single lane, the autonomous driving control that can be performed only in the curves having a predetermined curvature, the autonomous driving control having a restriction in controlling in the traffic jam, or the like). Alternatively, the travel control in the second mode may be a travel control other than the LTA (for example, a lane keeping assist (LKA), or the like) that can be performed without acquiring the additional information.

Furthermore, in the first embodiment and in the second embodiment, the travel control units 11 and 11A may be able to perform the travel control in another mode other than the travel control in the first mode and the travel control in the second mode.

In addition, in the first embodiment and in the second embodiment, during performing the travel control in the first mode, the travel control unit 11 may acquire (calculate) a distance (hereinafter, referred to as "continual distance") at which the travel control in the first mode can be continued or a time (hereinafter, referred to as "continual time") during which the travel control in the first mode can be continued. Specifically, the travel control unit 11 may acquire the continual distance or the continual time based on the required capacity acquired by the required capacity acquisition unit 14 and the remaining capacity acquired by the remaining capacity acquisition unit 15.

As an example, the travel control unit 11 may acquire the required capacity necessary for continuing the travel control in the first mode as much as the predetermined distance based on the history of the required capacity acquired by the required capacity acquisition unit 14 in the past, and may acquire the continual distance by dividing the remaining capacity by the necessary required capacity acquired above. In addition, the travel control unit 11 may acquire the required capacity necessary for continuing the travel control in the first mode as much as the predetermined time based on the history of the required capacity acquired by the required capacity acquisition unit 14 in the past, and may acquire the continual time by dividing the remaining capacity by the necessary required capacity acquired above. Alternatively, the travel control unit 11 may acquire the continual time first, and then may acquire the continual distance by multiplying the acquired continual time by an estimated future average vehicle speed, or conversely, the travel control unit 11 may acquire the continual distance first, and then, may acquire the continual time by dividing the acquired continual distance by the estimated future average vehicle speed. The travel control unit 11 may estimate the future average vehicle speed based on an average vehicle speed in the nearest predetermined distance or the latest predetermined time or may estimate based on the type of the road on which the vehicle is traveling (a general road, a highway, or the like).

The travel control unit 11 may compare the acquired continual distance or the continual time with previously stored threshold value respectively. The travel control unit 11 may compare the acquired continual distance with a threshold value stored in advance (a distance threshold value), and may compare the acquired continual time with a threshold value stored in advance (a time threshold value). The travel control unit 11 may continue the travel control in the first mode if the acquired continual distance or the continual time is not smaller than the threshold value stored in advance, and may stop the travel control in the first mode and start the travel control in the second mode if the acquired continual distance or the continual time is smaller than the threshold value stored in advance. The distance threshold value may be set to, for example, 200 m, 1 km, 5 km, or the like. In addition, the time threshold value may be set to, for example, 30 seconds, 2 minutes, 10 minutes, or the like.

In this case, in STEP S14, the travel control apparatus 1 may acquire the continual distance or the continual time based on the required capacity and the remaining capacity using the travel control unit 11, and then, may determine whether or not the continual distance or the continual time is smaller than the threshold value stored in advance. If it is determined that the continual distance or the continual time is smaller than the threshold value stored in advance, the travel control apparatus 1 may make the process proceed to STEP S16. On the other hand, if it is not determined that the continual distance or the continual time is smaller than the threshold value stored in advance, the travel control apparatus 1 may make the process proceed to STEP S18.

In addition, in the second embodiment, the required capacity acquisition unit 14A may acquire the total required capacity by multiplying the distance from the current position of the vehicle to reach the destination by a predetermined coefficient. According to this, the processing for calculating the total required capacity becomes easy.

Reference Embodiment

Figure 8:
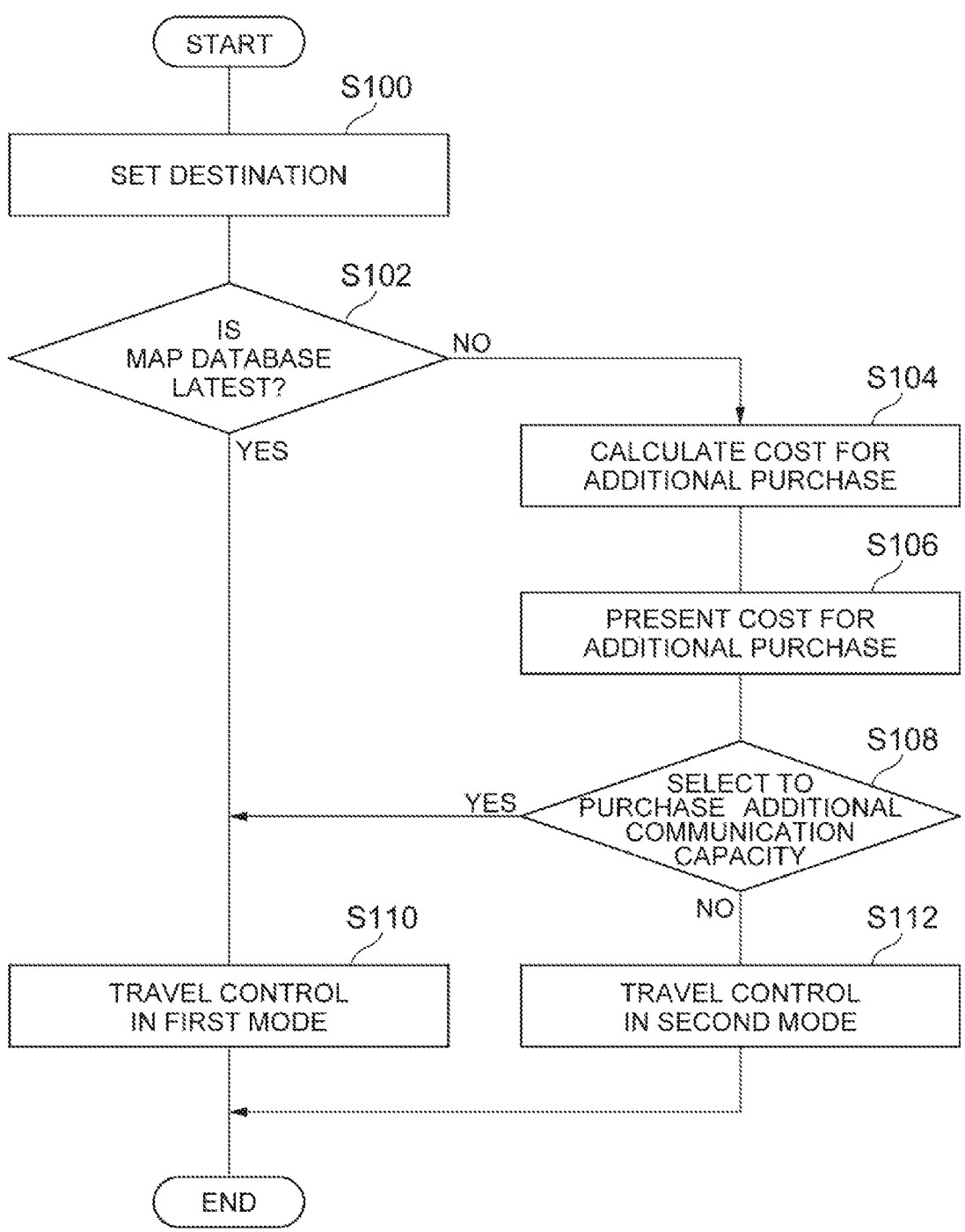
FIG. 8 is a flowchart illustrating a mode of travel control determination processing in the travel control system according to a reference embodiment.

Subsequently, a reference embodiment will be described. In the travel control system according to a reference embodiment, if the map information stored in the map information database 6 is not updated to the latest one, the communication cost for additionally purchasing the communication capacity is presented to the user, and then, if the communication capacity is additionally purchased, the travel control in the first mode (for example, the autonomous driving control) is performed, and if the communication capacity is not additionally purchased, the travel control in the second mode (for example, the LTA) is performed. FIG. 8 is a flowchart illustrating the mode of travel control determination processing in the travel control system according to the reference embodiment. The flowchart in FIG. 8 is executed when the intention to start the autonomous driving control of the vehicle is indicated by the user.

As illustrated in FIG. 8, in STEP S100, in the travel control apparatus of the travel control system, the destination in autonomous driving control is set by the user or the travel control apparatus. Thereafter, the travel control system makes the process proceed to STEP S102.

In STEP S102, the travel control system acquires the set target route to reach the destination. For example, the travel control system acquires the target route calculated based on the set destination, the position information on the vehicle measured by the GPS receiver 3, and the map information in the map information database 6 by the navigation system 7. The travel control system accesses the map information database 6 and the additional information database 23, and determines whether or not the latest map information necessary for performing the travel control in the first mode along the target route is stored in the map information database 6. If it is determined that the latest map information is stored in the map information database 6 (YES in STEP S102), the travel control system makes the process proceed to STEP S110. On the other hand, if it is determined that the latest map information is not stored in the map information database 6 (NO in STEP S102), the travel control system makes the process proceed to STEP S104.

In STEP S104, the travel control system calculates each communication cost (for example, the amount of money) for additionally purchasing the latest map information necessary for performing the travel control in the first mode or in the second mode along the target route. Here, in order to perform the travel control in the first mode, it is necessary to purchase the additional communication capacity, and in order to perform the travel control in the second mode, it is not necessary to purchase the additional communication capacity. The travel control system may calculate each communication cost using the travel control unit or using the server. If each communication cost is calculated by the server, the calculated each communication cost is transmitted from the server to the travel control unit. Thereafter, the travel control system makes the process proceed to STEP S106.

In STEP S106, the travel control system provides the user with the calculated each communication cost. The travel control system provides the user with the mode of travel control that can be performed and the communication cost necessary for performing the travel control in each mode in association with each other. For example, the travel control system may provide the user of the vehicle with the plan by outputting the image on the display of the HMI 8, and may provide the user of the vehicle with the plan to by outputting the sound to the speaker of the HMI 8. Thereafter, the travel control system makes the process proceed to STEP S108.

In STEP S108, the travel control system causes the user to select whether or not to purchase the additional communication capacity. Here, the travel control system causes the user to select whether to purchase the additional communication capacity to perform the travel control in the first mode, or not to purchase the additional communication capacity under the intention of performing the travel control in the second mode. For example, the travel control system may cause the user to select whether or not to additionally purchase the communication capacity via the input device (touch panel, button, voice input device, and the like) of the HMI 8. If the user selects to additionally purchase the communication capacity (YES in STEP S108), the travel control system makes the process proceed to STEP S110. On the other hand, if the user selects not to additionally purchase the communication capacity (NO in STEP S108), the travel control system makes the process proceed to STEP S112.

In STEP S110, the travel control system performs the travel control in the first mode using the travel control unit of the travel control apparatus. Thereafter, the travel control system ends the current processing.

In STEP S112, the travel control system performs the travel control in the second mode using the travel control unit of the travel control apparatus. Thereafter, the travel control system ends the current processing.

As described above, according to the travel control system in the reference embodiment, the user can select whether or not to additionally purchase the communication capacity based on the communication cost for additionally purchasing the communication capacity necessary for the travel control. Accordingly, the travel control system can suppress the occurrence of the communication cost not intended by the user.

A travel control apparatus according to an aspect of the present disclosure include: a travel control unit configured to perform a travel control of a vehicle; an information addition unit configured to acquire additional information to be added to map information via communication with surroundings, and to add the acquired additional information to the map information; a required capacity acquisition unit configured to acquire a required capacity that is a communication capacity necessary for acquiring the additional information; and a remaining capacity acquisition unit configured to acquire a remaining capacity of the communication capacity calculated based on a limit value of the communication capacity set in advance. The travel control unit is configured to be able to perform the travel control of the vehicle in a plurality of modes including at least a first mode and a second mode, and is configured to perform the travel control of the vehicle in any one of the modes based on the required capacity acquired by the required capacity acquisition unit and the remaining capacity acquired by the remaining capacity acquisition unit. The first mode is a mode of travel control of the vehicle performed based on the map information and is a mode of travel control of the vehicle in which the required capacity of the additional information acquired by the information addition unit is larger than that in the second mode.

According to the travel control apparatus, the travel control of the vehicle is performed in any one of the modes among a plurality of modes including at least the first mode and the second mode based on the required capacity and the remaining capacity. The first mode is the mode of travel control in which the required capacity for the additional information added to the map information is larger and the driving assistance level is higher than that in the second mode. If there is sufficient remaining capacity for the required capacity, the apparatus can perform the travel control in the first mode. On the other hand, if there is no sufficient remaining capacity for the required capacity, the apparatus can perform the travel control in the second mode by reducing the amount of the additional information to be acquired or without acquiring the additional information. Accordingly, the apparatus can change the mode of travel control according to the communication capacity.

The travel control apparatus according to the aspect of the present disclosure may further include: an information providing unit configured to provide information to the user of the vehicle; and a mode selection unit configured to cause the user to select the mode of travel control of the vehicle. The required capacity acquisition unit may be configured to acquire a total required capacity that is a total amount of required capacity necessary for performing the travel control of the vehicle to reach a destination in the first mode, if the destination is set for the travel control of the vehicle, the information providing unit may be configured to provide the user with a plan to perform the travel control of the vehicle to reach the destination in the second mode, when the remaining capacity is smaller than the total required capacity, the mode selection unit may be configured to cause the user who is provided with the plan to select the mode of travel control of the vehicle to be performed by the travel control unit, and the travel control unit may be configured to perform the travel control of the vehicle in the mode selected by the user. In this way, if the remaining capacity is not sufficient for the total required capacity for reaching the destination in the travel control, the apparatus causes the user to select before starting traveling of the of the vehicle whether to perform the travel control in the first mode by making the user bear the new communication cost or to perform the travel control in the second mode without making the user bear the new communication cost. Accordingly, since the user himself/herself selects whether or not to bear the new communication cost, the apparatus can suppress the occurrence of the communication cost not intended by the user.

In the travel control apparatus according to the aspect of the present disclosure, if the first mode is selected by the user as the mode of travel control of the vehicle and the travel control of the vehicle is performed in the first mode, the travel control unit may be configured to perform the travel control of the vehicle to reach the destination in the first mode regardless of the remaining capacity at that time point. According to this way, when the user selects the travel control in the first mode, even when the remaining capacity becomes insufficient for the required capacity, the apparatus does not lower the driving assistance level of the travel control during the traveling of the vehicle. Accordingly, since the mode of travel control selected by the user is not changed depending on the communication capacity, the apparatus can reduce the inconvenience the user feels.

A travel control system according to an aspect of the present disclosure includes a travel control apparatus described above and a server configured to be able to communicate with the travel control apparatus. The server is configured to include a required capacity calculation unit configured to calculate the required capacity of the additional information acquired by the information addition unit, and a required capacity transmission unit configured to transmit the required capacity calculated by the required capacity calculation unit to the travel control apparatus. The travel control apparatus is configured to include a required capacity reception unit configured to receive the required capacity transmitted by the required capacity transmission unit.

According to the travel control system, since the server calculates the required capacity, the travel control apparatus does not need to calculate the required capacity. Accordingly, in the control system, it is possible to reduce the amount of calculation for the processing performed by the travel control apparatus.

A travel control method according to an aspect of the present disclosure includes: acquiring a required capacity that is a communication capacity necessary for acquiring additional information to be added to map information via communication with surroundings; acquiring a remaining capacity of the communication capacity calculated based on a limit value of the communication capacity set in advance; and performing the travel control of the vehicle in any one of a plurality of modes including a first mode and a second mode based on the required capacity acquired in the acquiring of the required capacity and the remaining capacity acquired in the acquiring of the remaining capacity. The first mode is a mode of travel control of the vehicle performed based on the map information and is a mode of travel control of the vehicle in which the required capacity of the additional information acquired by the information addition unit is larger than that in the second mode.

According to the travel control method the travel control of the vehicle is performed in any one of the modes among a plurality of modes including at least the first mode and the second mode based on the required capacity and the remaining capacity. The first mode is a mode of travel control in which the required capacity of the additional information added to the map information is larger and the driving assistance level is higher than that in the second mode. In this method, if there is sufficient remaining capacity for the required capacity, the travel control can be performed in the first mode. On the other hand, in this method, if there is no sufficient remaining capacity for the required capacity, the travel control can be performed in the second mode by reducing the amount of the additional information to be acquired or without acquiring the additional information.

Accordingly, in this method, it is possible to change the mode of travel control according to the communication capacity.

What is claimed is:

1. A travel control apparatus configured to perform a travel control of a vehicle, comprising:
an electronic control unit (ECU),
wherein the ECU is configured to:
perform the travel control of the vehicle,
acquire additional information to be added to map information via communication with surroundings, and to add the acquired additional information to the map information,
acquire a required capacity that is a communication capacity necessary for acquiring the additional information,
acquire a remaining capacity of the communication capacity calculated based on a limit value of the communication capacity set in advance,
perform the travel control of the vehicle in a plurality of modes including at least a first mode and a second mode,
determine the travel control of the vehicle in any one of the first mode and the second mode based on the acquired required capacity and the acquired remaining capacity, and
perform the determined travel control of the vehicle,
wherein the first mode is a mode of travel control of the vehicle performed based on the map information and is a mode of travel control of the vehicle in which the required capacity of the acquired additional information is larger than that in the second mode, and
wherein the ECU is configured to
provide information to a user of the vehicle,
cause the user to select the mode of travel control of the vehicle,
acquire a total required capacity that is a total amount of required capacity necessary for performing the travel control of the vehicle to reach a destination in the first mode, if the destination is set for the travel control of the vehicle,
provide the user with a plan to perform the travel control of the vehicle to reach the destination in the second mode, when the remaining capacity is smaller than the total required capacity,
cause the user who is provided with the plan to select the mode of travel control of the vehicle to be performed, and
perform the travel control of the vehicle in the mode selected by the user.

2. The travel control apparatus according to claim 1, wherein the ECU is configured to perform the travel control of the vehicle to reach the destination in the first mode regardless of the remaining capacity at that time point, if the first mode is selected by the user as the mode of travel control of the vehicle and the travel control of the vehicle is performed in the first mode.

3. A travel control system comprising:
a travel control apparatus; and
a server configured to be able to communicate with the travel control apparatus,
wherein the travel control apparatus is configured to include an electronic control unit (ECU),
wherein the ECU is configured to:
perform a travel control of a vehicle,
acquire additional information to be added to map information via communication with surroundings, and add the acquired additional information to the map information,
acquire a required capacity that is a communication capacity necessary for acquiring the additional information,
acquire a remaining capacity of the communication capacity calculated based on a limit value of the communication capacity set in advance,
perform the travel control of the vehicle in a plurality of modes including at least a first mode and a second mode,
determine the travel control of the vehicle in any one of the first mode and the second mode based on the acquired required capacity and the acquired remaining capacity, and
perform the determined travel control,
wherein the first mode is a mode of travel control of the vehicle performed based on the map information and is a mode of travel control of the vehicle in which the required capacity of the acquired additional information is larger than that in the second mode,
wherein the server is configured to:
calculate the required capacity of the additional information acquired by the ECU, and
transmit the calculated required capacity to the travel control apparatus, and
wherein the ECU of the travel control apparatus is configured to receive the required capacity transmitted by the server,
wherein the ECU is configured to
provide information to a user of the vehicle,
cause the user to select the mode of travel control of the vehicle,
acquire a total required capacity that is a total amount of required capacity necessary for performing the travel control of the vehicle to reach a destination in the first mode, if the destination is set for the travel control of the vehicle,
provide the user with a plan to perform the travel control of the vehicle to reach the destination in the second mode, when the remaining capacity is smaller than the total required capacity,
cause the user who is provided with the plan to select the mode of travel control of the vehicle to be performed, and
perform the travel control of the vehicle in the mode selected by the user.

4. The travel control system according to claim 3, wherein the ECU is configured to perform the travel control of the vehicle to reach the destination in the first mode regardless of the remaining capacity at that time point, if the first mode is selected by the user as the mode of travel control of the vehicle and the travel control of the vehicle is performed in the first mode.

5. A travel control method comprising:
acquiring a required capacity that is a communication capacity necessary for acquiring additional information to be added to map information via communication with surroundings;

acquiring a remaining capacity of the communication capacity calculated based on a limit value of the communication capacity set in advance;

determining the travel control of a vehicle in any one of a plurality of modes including a first mode and a second mode based on the required capacity acquired in a step of acquiring the required capacity and the remaining capacity acquired in the step of acquiring the remaining capacity, and performing the determined travel control of the vehicle, wherein the first mode is a mode of travel control of the vehicle performed based on the map information and is a mode of travel control of the vehicle in which the required capacity of the acquired additional information is larger than that in the second mode, wherein, in the step of acquiring the required capacity, a total required capacity that is a total amount of required capacity necessary for performing the travel control of the vehicle to reach a destination is acquired in the first mode, if the destination is set for the travel control of the vehicle, wherein, in the step of performing the travel control, a user is provided with a plan to perform the travel control of the vehicle to reach the destination in the second, when the remaining capacity is smaller than the total required capacity, the user who is provided with the plan is caused to select the mode of travel control of the vehicle to be performed, and the travel control of the vehicle is performed in the mode selected by the user.

6. The travel control method according to claim 5, wherein, in the step of performing the travel control, the travel control of the vehicle to reach the destination is performed in the first mode regardless of the remaining capacity at that time point, if the first mode is selected by the user as the mode of travel control of the vehicle and the travel control of the vehicle is performed in the first mode.

\* \* \* \* \*